(12) United States Patent
Shiau (10) Patent No.: US 10,802,329 B2
(45) Date of Patent: Oct. 13, 2020

(54) COLOUR FILTER, DISPLAY APPARATUS AND METHOD FOR MANUFACTURING COLOUR FILTER

(71) Applicants: TUNGHSU (KUNSHAN) DISPLAY MATERIAL CO., LTD., Kunshan Suzhou, Jiangsu (CN); TUNGHSU OPTOELECTRONIC TECHNOLOGY CO., LTD., Shijiazhuang, Hebei (CN); TUNGHSU GROUP CO., LTD., Shijiazhuang, Hebei (CN)

(72) Inventor: Yihau Shiau, Hebei (CN)

(73) Assignees: TUNGHSU (KUNSHAN) DISPLAY MATERIAL CO., LTD., Jiangsu (CN); TUNGHSU OPTOELECTRONICS TECHNOLOGY CO., LTD., Hebei (CN); TUNGHSU GROUP CO., LTD., Hebei (CN)

( * ) Notice: Subject to any disclaimer, the term of this patent is extended or adjusted under 35 U.S.C. 154(b) by 0 days.

(21) Appl. No.: 16/474,138

(22) PCT Filed: Dec. 30, 2016

(86) PCT No.: PCT/CN2016/113512
§ 371 (c)(1),
(2) Date: Jun. 27, 2019

(87) PCT Pub. No.: WO2018/120022
PCT Pub. Date: Jul. 5, 2018

(65) Prior Publication Data
US 2019/0317363 A1 Oct. 17, 2019

(51) Int. Cl.
*G02F 1/1335* (2006.01)
*G02F 1/1333* (2006.01)
(Continued)

(52) U.S. Cl.
CPC .. *G02F 1/133516* (2013.01); *G02F 1/133514* (2013.01); *G02B 5/201* (2013.01);
(Continued)

(58) Field of Classification Search
None
See application file for complete search history.

(56) References Cited

U.S. PATENT DOCUMENTS 8,189,140 B2  5/2012 Kim et al.
2002/0030780 A1* 3/2002 Nishida ............. G02F 1/133371
349/141

(Continued)

FOREIGN PATENT DOCUMENTS

CN  1417626  5/2003
CN  1769973  5/2006
(Continued)

OTHER PUBLICATIONS

International Search Report dated Sep. 27, 2017 in International (PCT) Application No. PCT/CN2016/113512.

*Primary Examiner* — Richard H Kim
(74) *Attorney, Agent, or Firm* — Wenderoth, Lind & Ponack, L.L.P.

(57) ABSTRACT

A color filter, a display apparatus, and a method for preparing the color filter. The color filter comprises: a substrate, black matrices formed on the substrate; color layers formed on the substrate, wherein the color layers comprise red pixel layers (R), green pixel layers (G), blue pixel layers (B), and
(Continued)

transparent pixel layers (W); a planarization layer (OC) formed above the color layers and the black matrices; and columnar layers (PS) formed on the planarization layer (OC) and located above the black matrices. The transparent pixel layers (W) are covered in the red pixel layers (R), the green pixel layers (G) and the blue pixel layers (B) by the red pixel layers (R), the green pixel layers (G) and the blue pixel layers (B), respectively.

8 Claims, 7 Drawing Sheets

(51) Int. Cl.
G02F 1/1339 (2006.01)
G02B 5/20 (2006.01)
(52) U.S. Cl.
CPC .... *G02F 1/13394* (2013.01); *G02F 1/133512* (2013.01); *G02F 2001/13396* (2013.01); *G02F 2001/133357* (2013.01); *G02F 2001/133519* (2013.01); *G02F 2201/52* (2013.01)

(56) References Cited

U.S. PATENT DOCUMENTS

| | | |
|---|---|---|
| 2005/0134763 A1 | 6/2005 | Kang |
| 2006/0092353 A1* | 5/2006 | Kim ................... G02B 5/201 |
| | | 349/110 |
| 2009/0207371 A1 | 8/2009 | Yamamoto et al. |
| 2015/0198835 A1* | 7/2015 | Kwon ................. G02F 1/13394 |
| | | 349/139 |

FOREIGN PATENT DOCUMENTS

| | | |
|---|---|---|
| CN | 1776467 | 5/2006 |
| CN | 101324728 | 12/2008 |
| CN | 102819057 | 12/2012 |
| CN | 205281079 | 6/2016 |
| CN | 106483707 | 3/2017 |
| JP | 7-181473 | 7/1995 |
| JP | 2001-343661 | 12/2001 |
| JP | 2003-177410 | 6/2003 |
| JP | 2009-192757 | 8/2009 |
| JP | 2010-117829 | 5/2010 |
| JP | 2016-31513 | 3/2016 |
| KR | 10-0652061 | 12/2006 |

* cited by examiner

Light transmittance increases, but the resolution decreases.

W transparent pixel

The effect of color mixing is good, and the resolution remains

Displayer (low gray scale display)

COLOUR FILTER, DISPLAY APPARATUS AND METHOD FOR MANUFACTURING COLOUR FILTER

TECHNICAL FIELD

The present invention relates to a color filter, a display apparatus comprising the color filter, and a method for preparing the color filter of the present invention.

BACKGROUND ART

A color filter is an optical filter presenting colors, may display a corresponding color precisely after a light source passes through a color module, and thus presents rich colors.

A usage of the color filter comprises performing contrast enhancement to a monochrome display (e.g, VF (Vacuum Fluorescent) display, EL (Electroluminescent) display, LED (Light Emitting Diode) display, etc.) through a color selection passband and by the maximum output power of a display (e.g, an LCD, Liquid Crystal Display). A broadband filter is used to improve the contrast and performance of an optical scanner and a red, yellow, and amber light emitting diode display. An intermediate-density three-groove filter and a polarizing mirror are used to enhance the contrast of the liquid crystal display (LCD) by reducing inner reflection and generating a relatively large variable between the output power of the display and the background.

Figure 1:
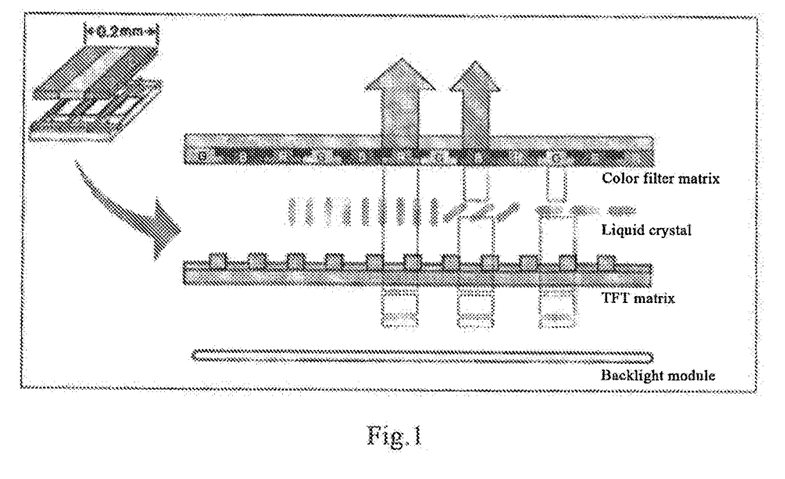
FIG. 1 shows that the color filter is a key part of a liquid crystal display for colorization.

FIG. 1 shows that the color filter is a key part of a liquid crystal display for colorization. The liquid crystal display is an inactive luminescent assembly, which usually comprises a color filter 1, a liquid crystal panel 2, a TFT matrix 3, and a backlight module 4, the display of colors of the liquid crystal display needs to be provided with a light source through an inner backlight module (e.g., a penetrating LCD) or an external ambient light (e.g., a reflective or semi-penetrating LCD), controlling a drive IC (a drive chip) and the liquid crystal panel 2 to form gray scale display, providing chromacities through R, G, and B (wherein R denotes red, G denotes green, and B denotes blue) color layers of the color filter, and finally, forming a color display image.

Figure 2:
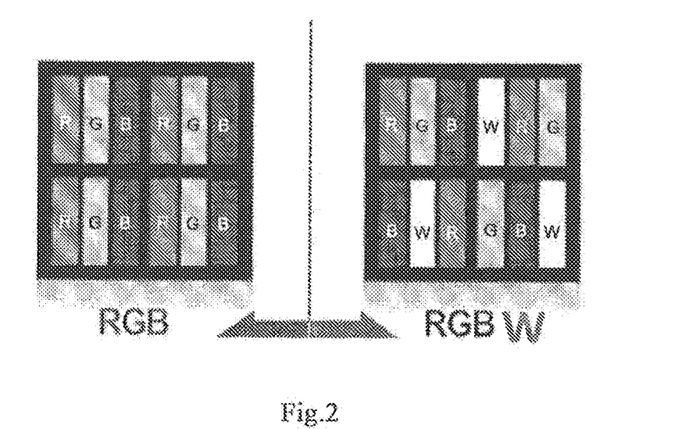
FIG. 2 is a schematic diagram showing the change of the color filter from RGB to RGBW.

SUMMARY OF THE INVENTION in recent years, in order to increase the brightness of panels, the improvements are usually made for the structures of color filters, and moreover, a technology which is called RGBW is shown by a schematic diagram in FIG. 2.

Originally the RGB technology mainly relates to one pixel corresponding to three sub pixels on an display screen, that is, one independent pixel corresponds to three sub pixels, R. G, and B; RGBW means adding a transparent pixel in addition to the three pixels R (red), G (green), and B (blue); two independent pixels share five sub pixels, so that at the same resolution, the amount of sub pixels is reduced significantly, thereby the costs are saved; this addition of the transparent sub pixel may also increase the brightness of the screen; however, the disadvantage is that the optimization of color may not as good as the original arrangement.

Conventional pixels are composed of red (R), green (G), and blue (B) pixels; pixels of a full high definition panel, which is also referred to as an FHD panel for short, are 1,920×1,080, and each of the pixels consists of 3 sub pixels; therefore the FHD panel has 6.20 million colors totally. The resolution of an ultra high definition panel, which is also referred to as an UHD panel for short, is 3,840×2,160, which denotes that the panel has about 24.90 million colors; therefore the resolution of the UHD panel is 4 times that of the FHD panel, and thus, the UHD panel is also called 4K panel.

Although the principles are same, RGBW panels generally developed by the companies differ from traditional UHD television panels slightly in that a white (W) sub pixel is added to the pixels in addition to the R, G, and B pixels.

Briefly, the amount of pixels for each horizontal scanning line on the UHD panel is 3,840, and the amount of sub pixels in an RGB architecture is 11,520; with regard to a panel of RGBW architecture, since 4 sub pixels RGBW constitute 1 pixel, the actual amount of pixels for each horizontal scanning line only remains 2,880; however, the amount of vertical pixels on the RGBW panel is still 2,160, which is same as that of an UHD panel in RGB arrangement.

As shown in FIG. 1, traditional pixels are composed of R (red), G (green), and B (blue). Pixels of an FHD panel is 1920×1080, and each of the pixels consists of three sub pixels (R, G, and B); therefore the FHD panel has 6.20 million colors totally; the resolution of a 4K panel is 3840×2160, which denotes that the panel has 24.90 million colors (3840×2160 pixels, wherein each of the pixels consists of three sub pixels); therefore the resolution of the UHD (4K) panel is four times that of the FHD (2K×1K) panel.

Figure 3:
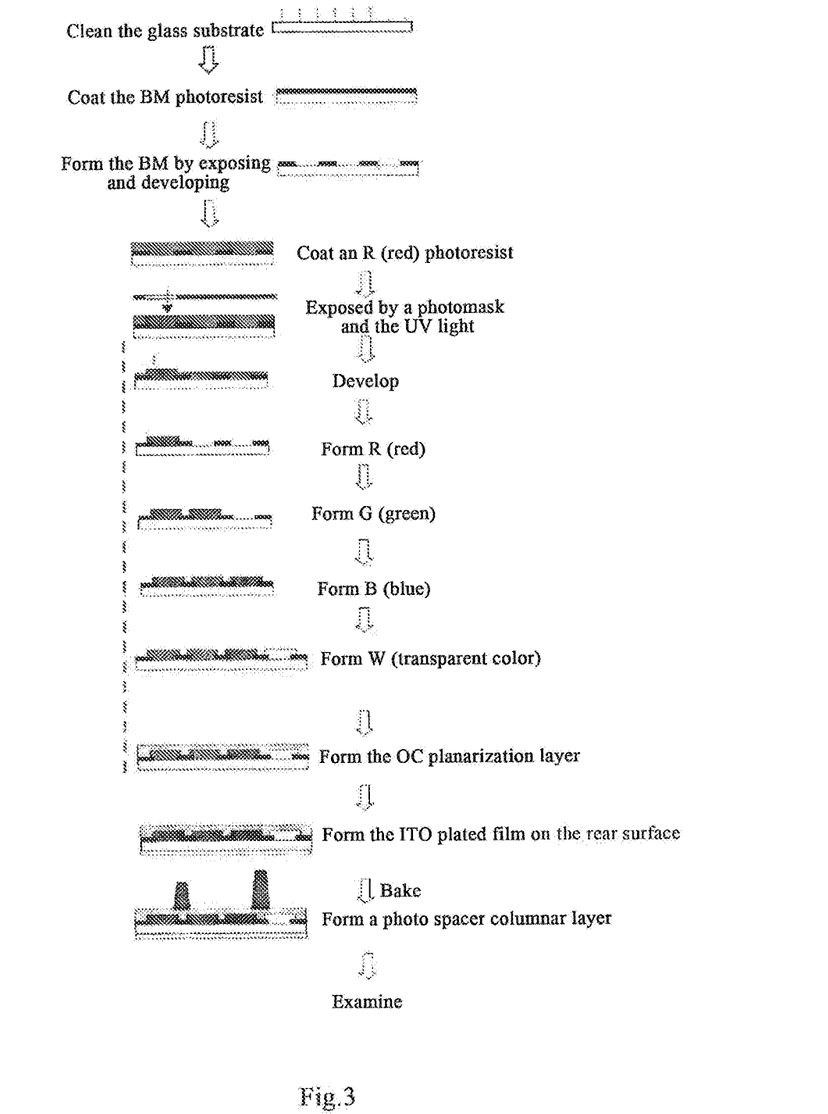
FIG. 3 shows a producing flow chart of a traditional RGBW technology.

In addition, in order to increase image quality, many companies use GMA (gamut mapping algorithm) and SPR (sub pixel rendering) technologies in their RGBW panels. However, addition of a transparent pixel (a white pixel) needs a working procedure of forming a transparent photoresist; as shown in a manufacturing flow chart of FIG. 3, the glass substrates need to be cleaned at first; a black matrix (referred to as BM hereinafter for short) photoresistance is coated; a BM is formed by exposing and developing steps. Then a red (R) photoresist is coated, exposed under photomask and the UV light, and developed by the step of developing; red (R), green (G), and blue (B) are formed respectively; a transparent color (W) is formed; an OC planarization layer (an over coat, referred to as OC hereinafter for short) is formed on different pixel layers; an ITO (indium tin oxide) plated film is formed on rear surface; after baking, the photo spacer (referred to as PS hereinafter for short) columnar layers (comprising main columnar layers and sub columnar layers) are formed. Since a manufacturing procedure for the transparent pixel is added (including devices for lithography/developing/hardening, etc.), the overall cost of manufacture for the color filter increases by about 12%, thus affecting the extensive popularization of the technology.

Figure 4:
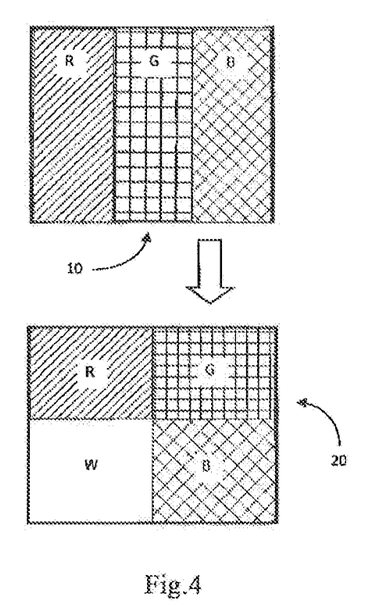
FIG. 4 shows an RGBW design in the prior art.

Patent EP 1844462 B1 disclosed a traditional RGBW design, the RGBW solution disclosed in this patent is as shown in FIG. 4 (FIG. 1 of said patent document); it can be seen that in this design, a W pixel is too far away from R, G, and B pixels; therefore, the effect of color mixing is poor, and color computation is difficult and imprecise.

Figure 5:
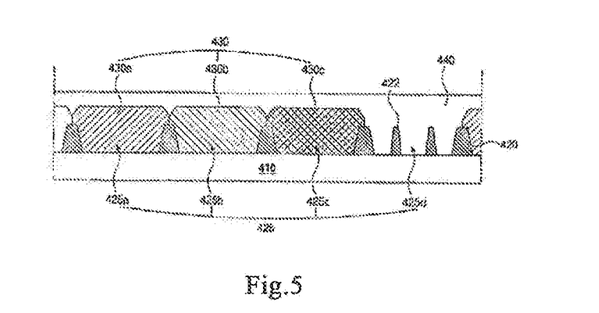
FIG. 5 shows another RGBW design in the prior art.

Taking the U.S. Pat. No. 7,515,225 as an example, in order to complete combination of a planarization layer with a W pixel in one working step (manufacture procedure), columnar layers may also be made while the BM (black matrix) layers are manufactured. The collapse of the planarization layer (an OC layer) is avoided in the position of the W pixel. However, this structure has the problem of reduction in light transmittance compared with the original design of RGBW (because the ray of light are shielded by the BM), the structure of which is shown in FIG. 5; in this figure, color filter patterns are denoted by 430, red, green, and blue color filter patterns are denoted by 430a, 430b, and 430c respectively, a black matrix is denoted by 420, a virtual pattern is denoted by 422, a first opening, a second opening, and a third opening are denoted by 425a, 425b, and 425c respectively, a fourth opening is denoted by 425d, a substrate is denoted by 410, and a planarization layer is denoted by 440.

The above information is only used to enhance the understanding of the background of the present invention, and therefore may include information that does not constitute the prior art known to a person skilled in the art.

In view of the above existing problem about the RGBW structure, there is an urgent need for an effective RGBW structure that may be produced in a simple manner without significantly increasing the cost, and for a color filter with good color displaying effect and without reduction in light transmittance and other problems.

With the color filter provided according to the present invention, light transmittance may be increased effectively, while the resolution would not be reduced, and the effect of color mixing is good.

With the color filter provided according to the present invention, the columnar layers would not tilt, the problem of cell gap mura would not occur to the liquid crystal display formed, the requirement of manufacturers that the difference between cell gaps should be less than 0.1 µm can be achieved, and the problem of color mura may be overcome effectively.

The present invention further provides a method for preparing the color filter; the color filter of the present invention may be acquired effectively according to the preparing method; this method has simple operations, and the number of steps and the amount of use of materials involved in the method are same as a traditional producing method, it would not increase the cost of production significantly.

Moreover, since the transparent pixel is not arranged in a region outside the RGB pixels, the light transmittance may be improved and the effect of color mixing may be increased.

The objects of the present invention are implemented through the following technical solutions.

1. A color filter, comprising:
a substrate,
black matrices formed on the substrate,
color layers formed on the substrate, wherein the color layer comprises a red pixel layer, a green pixel layer, a blue pixel layer, and a transparent pixel layer,
a planarization layer formed above the color layer and the black matrix, and
columnar layers formed on the planarization layer and located above the black matrices, wherein
transparent pixel layers are covered in the red pixel layers, the green pixel layers, and the blue pixel layers by the red pixel layers, the green pixel layers, and the blue pixel layers respectively.

2. The color filter of item 1, wherein the columnar layers comprise sub columnar layers and main columnar layers, the height difference between the film thicknesses of the respective main columnar layers is controlled within the range of ±0.1 µm, that is, within the range of 0.2 µm.

3. The color filter of item 1 or 2, wherein the height of the transparent pixel layer formed on the substrate (also denoted by "W height" in the present invention)≤the height of the black matrix formed on the substrate (also denoted by "BM height" in the present invention)+0.2 µm, that is, the A value=W height−BM height≤0.2 µm, wherein the A value may also be a negative value.

4. A color filter, comprising:
a substrate,
black matrices formed on the substrate,
color layers formed on the substrate, wherein the color layer comprises a red pixel layer, a green pixel layer, a blue pixel layer, and a transparent pixel layer,
columnar layers formed on the black matrices, wherein
transparent pixel layers are covered in the red pixel layers, the green pixel layers, and the blue pixel layers by the red pixel layers, the green pixel layers, and the blue pixel layers respectively; and wherein
the columnar layers comprise sub columnar layers and main columnar layers, the height difference between the film thicknesses of the respective main columnar layers is controlled within the range of ±0.1 µm, that is, within the range of 0.2 µm.

5. A color filter, comprising:
a substrate,
black matrices formed on the substrate,
color layers formed on the substrate, wherein the color layer comprises a red pixel layer, a green pixel layer, a blue pixel layer, and a transparent pixel layer,
columnar layers formed on the black matrices, wherein
the transparent pixel layers are covered in the red pixel layers, the green pixel layers, and the blue pixel layers by the red pixel layers, the green pixel layers, and the blue pixel layers respectively; and wherein
the height of the transparent pixel layer formed on the substrate (W height)≤the height of the black matrix formed on the substrate (BM height)+0.2 µm, that is, the A value=W height−BM height≤0.2 µm.

6. The color filter of any of items 1-5, wherein the transparent pixel layers formed on the substrate and covered in each of the red pixel layers, the green pixel layers, and the blue pixel layers are disconnected.

7. The color filter of item 6, wherein the distance between the transparent pixel layers disconnected from each other is above 5 µm.

8. The color filter of any of items 1-7, wherein the substrate is a glass substrate.

9. The color filter of any of items 1-8, further comprising a conductive layer formed on the back of the substrate.

10. The color filter of any of items 1-9, wherein the photoresist material used in the respective structures forming the color filter is a negative photoresist material.

11. A display panel, comprising the color filter as claimed in any of items 1-10.

12. A display apparatus, comprising the display panel as claimed in item 11.

13. A method for preparing a color filter, comprising the following steps:
performing ITO film plating on the rear surface of a substrate of the color filter,
forming black matrices on the front surface of the substrate,
forming transparent pixel layers in the gaps between the respective black matrices formed on the front surface of the substrate,
forming red pixel layers, green pixel layers, and blue pixel layers on the substrate by covering the transparent pixel layers,
forming a planarization layer above the red pixel layers, the green pixel layers, and the blue pixel layers and the black matrix, and
forming columnar layers above the planarization layer and above the corresponding black matrices.

14. A method for preparing a color filter, comprising the following steps:

performing ITO film plating on the rear surface of a substrate of the color filter, forming black matrices on the front surface of the substrate, forming transparent pixel layers in the gaps between the respective black matrices formed on the front surface of the substrate, covering the transparent pixel layers so as to form red pixel layers, green pixel layers, and blue pixel layers on the substrate, and forming columnar layers on the corresponding black matrices.

15. The method of item 13 or 14, wherein the height of the transparent pixel layer formed on the substrate (W height)≤the height of the black matrix formed on the substrate (BM height)+0.2 μm.

16. The method of any of items 13-15, wherein the formed transparent pixel layers are disconnected transparent pixel layers when the transparent pixel layers are formed in the gaps between the respective black matrices.

17. The method of item 16, wherein the distance between the transparent pixel layers disconnected from each other is above 5 μm.

18. The method of any of items 13-17, wherein a photoresist material used in respective structures forming the color filter is a negative photoresist material.

19. The method of claim 13 or 14, wherein the color filter prepared is the color filter as claimed in any of items 1-10.

BRIEF DESCRIPTION OF THE DRAWINGS

Other advantages and benefits of the present invention will be apparent to a person skilled in the art by reading the detail description of preferred specific implementations below. The accompanying drawings are only for the purpose of showing the preferred implementations and should not be considered as the limitations to the present invention. Apparently, the accompanying drawings in the following description show merely some embodiments of the present invention, and a person of ordinary skill in the art would still derive other drawings from these accompanying drawings without any creative efforts. Same reference signs indicate the same components throughout the accompanying drawings.

DETAILED DESCRIPTION OF EMBODIMENTS

Specific embodiments of the present invention will be described in more detail with reference to the accompanying drawings. Although the specific embodiments are shown in the accompanying drawings, it should be understood that the present invention may be implemented in various manners instead of being limited by the embodiments set forth here. Rather, these embodiments are provided to have a more thorough understanding of the present invention and convey the scope of the present invention to a person skilled in the art completely.

Figure 6:
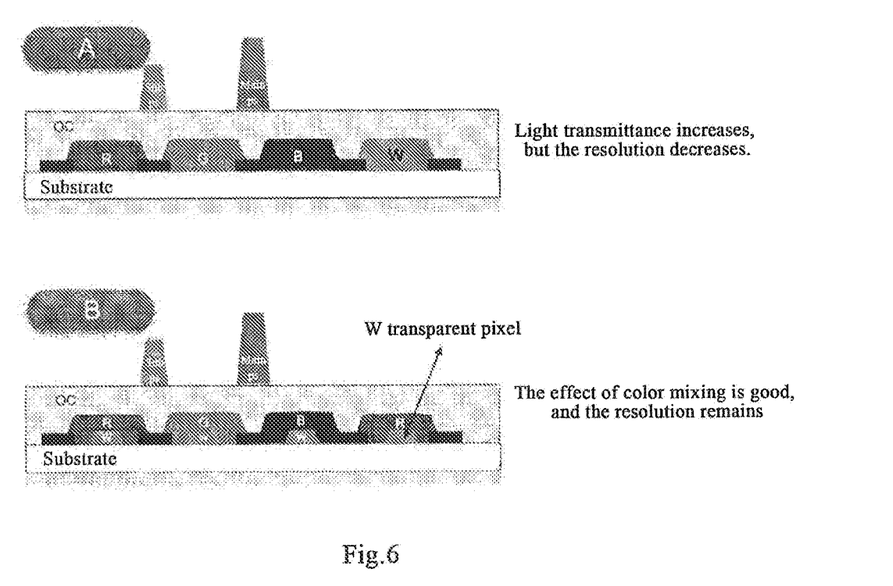
FIG. 6(A) is a exploded schematic diagram showing the problems existing in an RGBW structure in the prior art.
FIG. 6(B) is a general exploded schematic diagram of an RGBW structure of the present invention.

As shown in FIG. 6(A), it is an RGBW structure present in the prior art. As described above, in order to obtain the RGBW structure, a working procedure of preparing a W transparent pixel needs to be added, which may increase the cost of production. Moreover, the W pixel is far away from R, G, and B pixels, the effect of color mixing is poor, and color computation is not easy and precise. Although light transmittance increases, the resolution may be reduced.

As shown in FIG. 6(B), it is a general exploded schematic diagram of an RGBW structure involved in the present invention, the present invention provides a color filter, wherein the color filter comprises: a substrate; a black matrix (denoted by BM) formed on the substrate; a color layer formed on the substrate, wherein the color layer comprises a red pixel layer (denoted by R), a green pixel layer (denoted by G), a blue pixel layer (denoted by B), and a transparent pixel layer (denoted by W); a planarization layer (denoted by OC) formed above the color layer and the black matrix; and columnar layers (denoted by PS) which are formed on the planarization layer and located above the black matrices, wherein the transparent pixel layer is covered in the red pixel layer, the green pixel layer, and the blue pixel layer by the red pixel layer, the green pixel layer, and the blue pixel layer respectively.

It can be seen therefrom that the present invention differs from the RGBW structure in the prior art shown in FIG. 4, FIG. 5, and FIG. 6(A) in that the transparent pixels (W pixels) are formed in the R, G, and B pixels respectively, and then, the planarization layers are formed above the color layers, since the W pixels would have no occupation in positions, the resolution of the pixel may be improved, the effect of color mixing is good, and the working procedure of manufacturing the whole color filter may be simplified as well.

The color filter of the present invention further comprises a conductive layer formed on the back of the substrate. The conductive layer may be any conductive layer known in the art, preferably an ITO conductive layer.

The substrate of the present invention may be a glass substrate or a suitable substrate of any other types.

In addition to the uniformization of undulation (height difference) of the film thickness of the R/G/B pixels, the planarization layer according to the present invention may also be used to prevent color (colored) pixels from ion impurities, because ions may result in changes in driving electrical property of the liquid crystal, thus affecting the gray scale. Moreover, the planarization layer may also increase the chemical resistance of the pixel layers and its sputtering resistance from a conductive film and improve the smoothness of colored pixel layers.

In the present invention, materials used to form the black matrix and the respective colored pixel layers are not defined specifically, therefore any conventional material in the art may be used.

Figure 9:
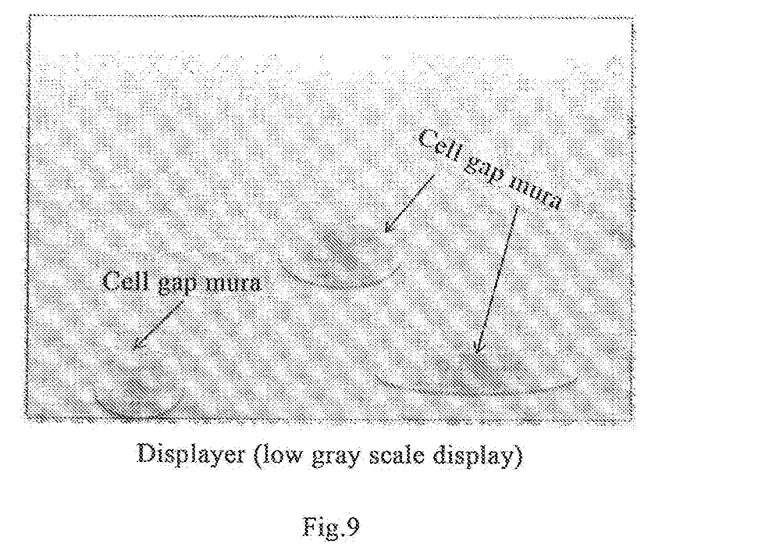
FIG. 9 is a schematic diagram showing the problem of cell gap mura generated in the color filter.

In specific implementations of the present invention, the columnar layers comprise sub columnar layers (sub PS) and main columnar layers (main PS), the height differences between the heights of the film thickness for respective main columnar layers are controlled within the range of ±0.1 μm, that is, within the range of 0.2 μm. By implementing such a structure, the finally formed cell gaps between liquid crystals on the liquid crystal screen may be less than 0.1 μm, and color mura would not occur. FIG. 9 is a schematic diagram showing color mura; it can be seen that the gray scale and the brightness may be uneven after a panel is lit up. The method of calculating the height difference between the heights of the film thickness of respective main columnar layers is known to a person skilled in the art, that is, the height of the film thickness of the main PS may be the height from the bottom of the PS to 90% of the height of the PS, and may also be the height from the bottom to the top of the main PS, as long as it is characterized by a unified calculation method by a person skilled in the art.

Figure 8:
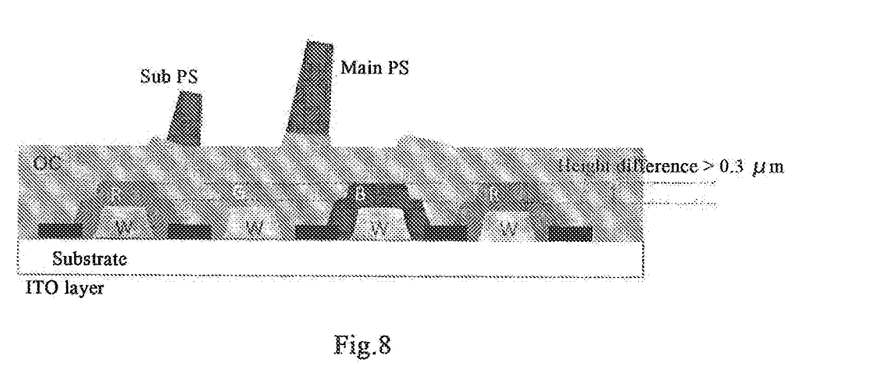
FIG. 8 is an exploded schematic diagram of a structure of a color filter shown in comparison herein.

The inventor finds that if the transparent pixel layer is made too large, as shown in FIG. 8, a variation or bump may readily occur to the RGB pixels after grinding. The columnar layers (PS) on the planarization layer may become tilted, and thus the display may have the problem of cell gap mura as shown in FIG. 9. After the panel is lit up, the gray scale and the brightness may be uneven. At this point, the transparent pixel layer being made too large means that the height of the transparent pixel layer itself is too large, so that protrusions or bumps occur to the R, G, and B color pixel layers themselves, and the R, G, and B pixel layers themselves have the height difference greater than 0.3 μm, as shown in FIG. 8.

Figure 10A:
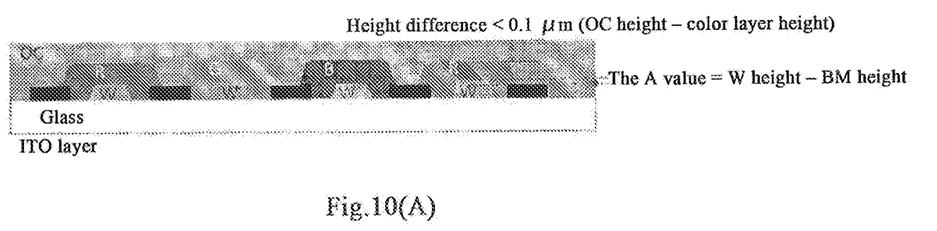
FIG. 10(A) is an exploded schematic diagram of a structure of the color filter shown in the embodiments of the present invention.
Figure 10B:
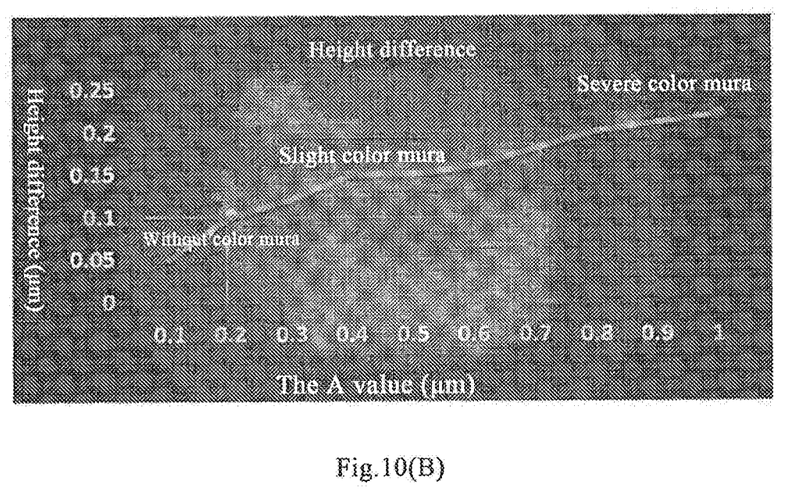
FIG. 10(B) is a schematic diagram showing relationships of the A value and the height difference between RGB layers and a planarization layer as well as the generation of color mura in a formed liquid crystal.

In the study of the RGBW structure, the inventor finds that if the height of the transparent pixel layer formed on the substrate (W height)≤the height of the black matrix formed on the substrate (BM height)+0.2 μm, that is, the A value=W height−BM height≤0.2 μm, color mura on the liquid crystal screen may be suppressed effectively. FIG. 10(A) and FIG. 10(B) show a method of calculating the A value respectively, present relationships of the A value and the height difference between the RGB pixel layers and the planarization layer, and show the degree of severity of color mura generated in the respective regions.

In addition, if the A value is controlled appropriately, the film thickness of the R/G/B colored pixels of the present invention may be controlled to be more uniform. In this case, the planarization layer may be omitted, and thus a working procedure of forming a planarization layer is also unnecessary, thereby further reducing the cost of production of the color filter.

That is, the present invention further relates to a color filter, wherein the color filter comprises: a substrate; a black matrix formed on the substrate; a color layer formed on the substrate, wherein the color layer comprises red pixel layers, green pixel layers, blue pixel layers, and the transparent pixel layers; and columnar layers formed above the black matrices, wherein the transparent pixel layer is covered in the red pixel layer, the green pixel layer, and the blue pixel layer by the red pixel layer, the green pixel layer, and the blue pixel layer respectively; and the columnar layers comprise sub columnar layers and main columnar layers, the height differences between heights of the film thickness of respective main columnar layers are controlled within the range of 0.1 μm, that is, within the range of 0.2 μm.

The present invention further relates to a color filter, wherein the color filter comprises: a substrate; a black matrix formed on the substrate; a color layer formed on the substrate, wherein the color layer comprises a red pixel layer, a green pixel layer, a blue pixel layer, and a transparent pixel layer; and columnar layers formed above the black matrices, wherein the transparent pixel layer is covered in the red pixel layer, the green pixel layer, and the blue pixel layer by the red pixel layer, the green pixel layer, and the blue pixel layer respectively; and the height of the transparent pixel layer formed on the substrate (W height)≤the height of the black matrix formed on the substrate (BM height)+0.2 μm, that is, the A value=W height−BM height≤0.2 μm.

According to the exploded structure shown in FIG. 10(A), when the A value=W height−BM height≤0.2 μm, the height difference between the RGB pixel layers and the planarization layer may be controlled effectively to be about 0.1 μm, moreover, in this case, color mura may not occur to the display, thereby meeting the requirements of panel manufactures. Additionally in the present invention, the W pixels are covered in the R, G, and B pixel layers skillfully, this not only increases light transmittance, but also has no reduction in the resolution, while the effect of color mixing is very good as well. Furthermore, the A value may also be negative, that is, the height of the transparent pixel layer may be less than the height of the BM.

Figure 11:
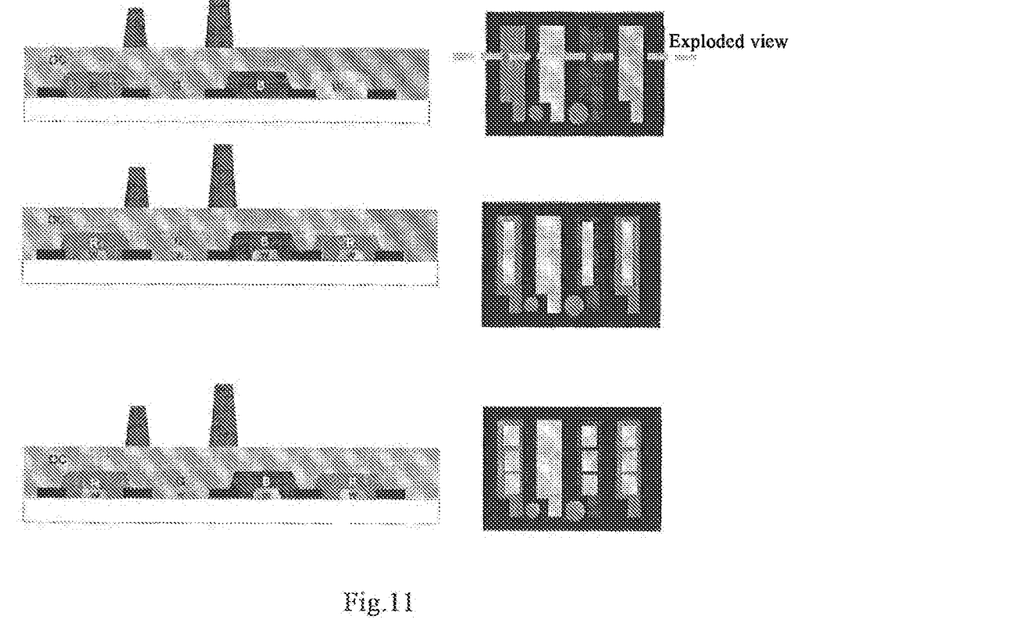
FIG. 11 is an exploded schematic diagram of color filters in two implementations of the present invention and in the prior art.

The inventor finds by study that during forming a transparent pixel, if a continuous elongated transparent pixel is formed, the pixels will contaminate each other. In a more preferred implementation of the present invention, the RGBW structure of the present invention is further improved as shown in the lowermost panel of FIG. 11. That is the transparent pixel layers formed on the substrate and covered in each of the red pixel layer, the green pixel layer, and the blue pixel layer are disconnected. The panel on the right side of FIG. 11 is a top view, it can be seen that in the top view, the respective transparent pixel layers may be shown explicitly to be not continuous but disconnected. Further, the distance between the transparent pixel layers disconnected from each other is preferably above 5 μm.

Figure 12:
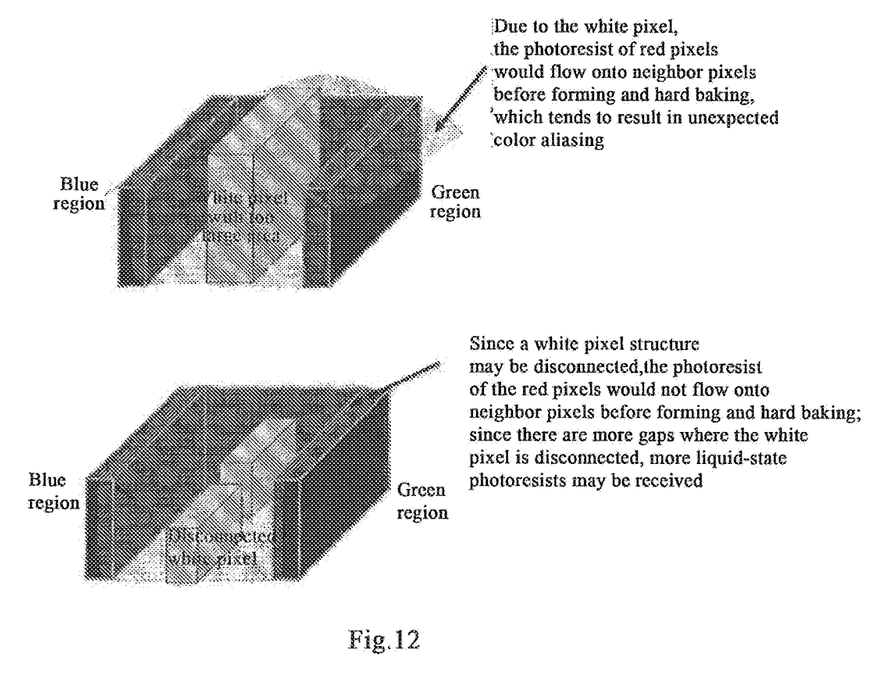
FIG. 12 is a schematic diagram showing the forming process of RGB pixel layers of the color filter in a preferred implementation of the present invention.

The advantages of such a disconnected structure are given as shown in FIG. 12, as shown in the upper panel in FIG. 12, due to the transparent pixel, a photoresist of the red pixel, for example, may flow onto a neighbor pixel before forming and hard baking (baking), this tends to result in unexpected color aliasing.

As shown in the lower panel in FIG. 12, since a transparent pixel structure may be disconnected, the photoresist of the red pixel would not flow onto its neighbor pixels before the forming and hard baking (baking). The reason is that there are more gaps where the transparent pixels are disconnected, and which makes more liquid-state photoresists can be received.

The present invention further relates to a display panel, comprising the color filter of the present invention.

The display panel of the present invention may be, for example, a liquid crystal panel (an LCD panel), an organic EL panel (an OLED panel), a micro LED panel, or a reflection-type panel such as a micro-cup panel, a micro-particle panel, etc.

The present invention further relates to a display apparatus, comprising the display panel of the present invention described above.

The present invention further provides a method for preparing a color filter the method comprises the following steps: performing ITO film plating on the rear surface of a substrate of the color filter: forming a black matrix on the front surface of the substrate; forming a transparent pixel layer in the gaps between respective black matrices formed on the front surface of the substrate; forming a red pixel layer, a green pixel layer, and a blue pixel layer on the substrate by covering the transparent pixel layer; forming a planarization layer above the red pixel layers, the green pixel layers, the blue pixel layers and the black matrix; and forming the columnar layers above the planarization layer and above the corresponding black matrices.

The present invention further provides a method for preparing a color filter, comprising the following steps: performing ITO film plating on the rear surface of the substrate of the color filter; forming a black matrix on the front surface of the substrate; forming a transparent pixel layer in the gaps between the respective black matrices formed on the front surface of the substrate; forming red pixel layers, green pixel layers, and blue pixel layers on the substrate by covering the transparent pixel layers; and forming the columnar layers on the corresponding black matrices.

Specifically, the method of the present invention comprises performing the process based on a substrate; the substrate commonly used may be, for example, a glass substrate; at first, a black photoresist is coated on the glass substrate; the black photoresist covers the surface of the glass substrate and it is commonly a negative photoresist material; unnecessary portions are removed by exposing, developing and other processes; thus leaving the photoresist lines of the black matrices on the glass substrate; the photoresist lines enclose a shape of rectangles; these rectangular regions are also arranged in alignment as rows and columns.

Transparent photoresist is then coated in the gaps between the respective black matrices formed on the front surface of the substrate; the transparent photoresist is commonly negative one; unnecessary portions of the transparent photoresist are removed by exposing, developing and other processes, so as to form regularly distributed transparent pixel layers in the gaps between the black matrices moreover, the film thickness and shapes of the transparent pixel layers may be varied according to the size of a pixel opening area required by different products (also referred to as the resolution).

Furthermore, in a further preferred implementation of the present invention, since the transparent pixel layers formed are not continuous but disconnected, the color filter in the next working procedure may tend to flow into the disconnected region uniformly without ink accumulation, and after a working procedure of hot baking, irregular structure of protrusions of the color pixel would not be generated.

Red photoresists are then coated on the substrate formed with the black matrix and the transparent pixel layer; the red photoresists are commonly negative photoresists; unnecessary portions of the red photoresist are removed by exposing, developing and other processes, so as to cover the transparent pixels within the rectangular regions enclosed by the photoresist lines of the black matrices, thereby forming regularly distributed red pixel layers. By the same reasoning, a plurality of mutually separated and regularly distributed green pixel layers and blue pixel layers are formed by covering respective transparent pixels within the rectangular region enclosed by the photoresist lines of the black matrices. The red pixel layers, the green pixel layers and the blue pixel layers each covering the transparent pixel layers are same in quantity, and are distributed regularly, uniformly, and separately from each other.

Furthermore, the size and spacing of the colored pixels may be set according to the requirements for the pixel size and the resolution, and the photoresist lines of the colored pixels and the black matrices may be arranged by a process in the prior art applicable to the present invention.

The photolithography process used in the present invention is intended to obtain a required pattern on the photoresist layer and display the pattern on the glass substrate by optical and chemical reaction principles and chemical and physical etching methods via masking, exposing, developing and other working procedures.

In addition, the photoresist materials mainly include positive photoresist and negative photoresist. For the positive photoresist, the portions irradiated by light may be removed by chemicals in the step of developing, and unexposed portions may not be withdrawn by a developing solution and thus remain on the glass substrate. In the contrary, for the negative photoresist, the portions irradiated by light of the negative photoresist may not be removed by chemicals in the step of developing, and the portions not irradiated by light may be removed by chemicals in the step of developing.

A negative photoresist material is preferably used in the preparing method of the present invention.

In the preparing method of the present invention, colored photoresists include: pigment dispersion liquids; adhesive resins, such as alkali-soluble resins, unsaturated resin monomer, etc.; photoinitiators; organic solvents and additives.

For the pigment dispersion liquids, pigment powder containing aromatic groups is a mixture of a blue pigment and a purple pigment, wherein the blue pigment is one or more of phthalocyanine pigments, azo pigments, and heterocyclic pigments; and the purple pigment is one or more of thioindigo pigments and diazine pigments. The adhesive resins are one or more of acrylate polyester homopolymers, modified styrene acrylic acid copolymers, and anti-yellowing aldehyde resins; the basic or neutral organic solvents are one or more of propylene glycol methyl ether acetate, propylene glycol monomethyl ether, cyclohexane, propylene glycol diacetate, 2-heptanone, and cyclopentanone; the alcohol solvent is n-butyl alcohol.

The photoinitiators are one or more of ketoxime ester photoinitiators, benzilphotoinitiators, and alkyl benzophenonephotoinitiators; the organic solvents are one or more of propylene glycol methyl ether acetate, propylene glycol monomethyl ether, cyclohexane, propylene glycol diacetate, 2-heptanone, and cyclopentanone; the additives are one or more of flatting agents, coupling agents, defoaming agents, and ultraviolet absorbents.

Figure 7:
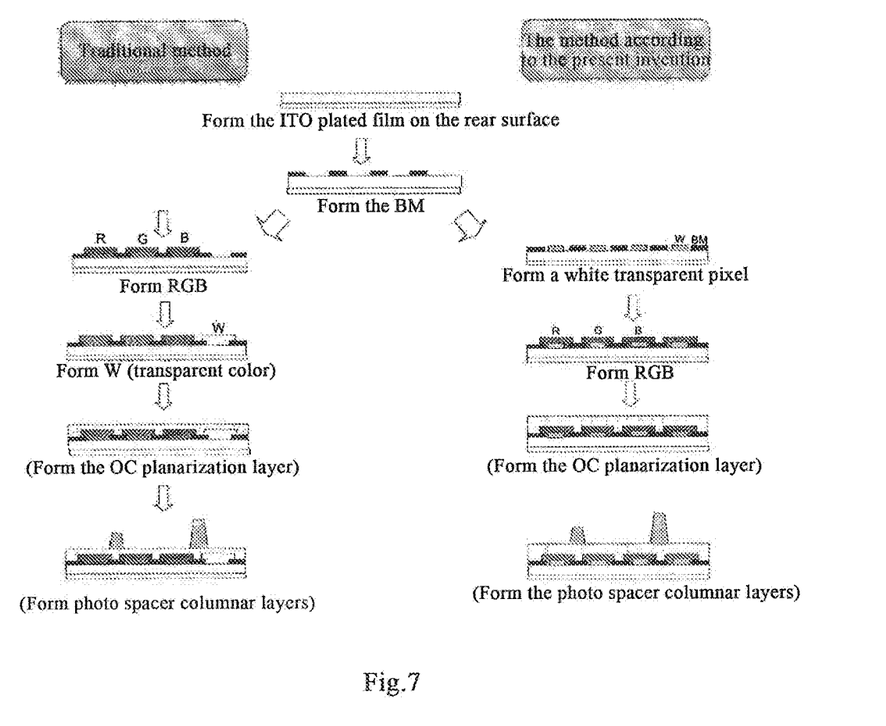
FIG. 7 shows the steps of the method of preparing the color filter of the present invention.

FIG. 7 is a schematic flow chart for the method of preparing a color filter of the present invention; for the convenience of the comparison, a method for preparing a color filter of an RGBW structure in the prior art is also shown. It can be seen from FIG. 7 that with the method for manufacturing a color filter of the present invention, transparent pixels should be made in the respective colored pixels in advance.

Since it differs from any conventional old structure technologies (designs except for the RGB pixels) in that the transparent pixels are included in the color pixels, the following advantages may be achieved: the effect of light transmittance is improved and the effect of color mixing is not affected. Especially, since the transparent pixel has the function of making any odd-shaped structure, alterations may be made to the light transmittance and color saturation required by different products; as such, the color filter of the present invention may be used in all energy-saving displays more easily.

Embodiments

Conditions of manufacturing a color filter used in the embodiments and comparative examples are given in Table 1; for PS materials with high film thickness and for the photoresist materials for forming respective BM, R, G, B, and W pixels, materials from JSR company in Japan are used to conduct experiments.

In addition, any other commercially available negative photoresist materials may be used to produce the color filter of the present invention, which will not be described further herein.

TABLE 1

| Steps in the method | Parameter | Specification | Description |
|---|---|---|---|
| Photoresist and coating | Photoresist | JSR (negative photoresist) | fixed |
| | Main thickness | 1.2 μm | fixed |
| | Refractive index | 1.44 | fixed |
| | Baking (temperature/time) | 90° C./100 s | fixed |
| Exposing | Defocus | 0-400 μm | variable |
| | Wavelength | 365 nm | fixed |
| | Numerical aperture | 0.04 | fixed |
| | Opaque region transmission | 0-3% | variable |
| | Opaque region phase | 0-180° | variable |
| | Continuity | 1 | fixed |
| | Strength | 30 mJ/cm$^2$ | fixed |
| | Exposure amount | 120 mJ | fixed |
| | Resolution | 1.1 μm | fixed |
| | Mask pattern size | 20 × 20 μm$^2$ | fixed |
| Developing | Module | KOH | fixed |

Embodiment 1

An attempt is made to manufacture a color filter with reference to Table 1 for specific parameters according to the preparing method described above in the description of the present invention. Initially, the inventor finds that if the transparent pixel layer is made too large, as shown in FIG. 8, a variation or bump may readily occur to the RGB pixels after grinding. The columnar layer (PS) on the planarization layer may become tilted, and thus the display may have the problem of cell gap mura as shown in FIG. 9. After the panel is lit up, the gray scale and the brightness could be uneven.

According to the conditions shown in Table 1 above, in embodiment 1, a series of color filters are obtained by changing the size of A value, and an exploded schematic diagram of the obtained color filters is shown in FIG. 10(A). Moreover, a diagram is made according to the A value and the height difference; as shown in FIG. 10(B), it can be seen that when the A value is less than or equal to 0.2 μm, the height difference between the R, G, and B layers and the planarization layer may be controlled well, so that the height difference between the columnar layers (PS) on the planarization layer, especially the main columnar layers, is within the range of ±0.1 μm; therefore, the display does not have the problem of cell gap mura as shown in FIG. 9. After the panel is lit up, uneven gray scale and uneven brightness would not occur.

Embodiment 2

In embodiment 2, it is found that during forming a transparent pixel, the pixels might contaminate each other if continuous elongated transparent pixels are formed. Therefore, the RGBW structure of the present invention is further improved as shown in the lowermost panel of FIG. 11. That is, the transparent pixel layers formed on the substrate and covered in each of the red pixel layers, the green pixel layers, and the blue pixel layers are disconnected. The panel on the right side of FIG. 11 is a top view; it can be seen that the respective transparent pixel layers are shown explicitly as not continuous but disconnected. Further, the distance between the transparent pixel layers disconnected from each other is preferably above 5 μm. Specific parameters for the producing method are same as those in the Table 1 except that the transparent pixel layers are controlled to be disconnected.

In embodiment 2, in order to further improve the transparency of the W pixel, resin materials are the adhesive resin materials described above that have little tendency to turn yellow and have high transparency.

The advantages of such a disconnected structure are given as shown in FIG. 12; as shown in the upper panel in FIG. 12, due to the transparent pixels, the photoresist of the red pixel, for example, may flow onto neighbor pixels before forming and hard baking, which tends to result in unexpected color aliasing.

As shown in the lower panel in FIG. 12, since the transparent pixel structure may be disconnected, the photoresist of the red pixel would not flow onto neighbor pixels before forming and hard baking; since there are more gaps where the transparent pixels are disconnected, more liquid-state photoresists may be received.

Various modifications and alternative forms are acknowledged in the present application. Specific implementations have been shown in the accompanying drawings with embodiments and have been described in detail in the present application. However, the present application is not intended to be limited by a particular form of the present disclosure. Rather, the present application is intended to include all modifications, equivalents, and alternatives within the scope of the present application. The scope of the present application is defined by the appended claims and legal equivalents thereof.

The invention claimed is:
1. A color filter, comprising:
a substrate,
black matrices formed on the substrate,
color layers formed on the substrate, wherein the color layer comprises a red pixel layer, a green pixel layer, a blue pixel layer, and a transparent pixel layer,
a planarization layer formed above the color layers and the black matrices, and
columnar layers formed on the planarization layer and located above the black matrices, wherein
the transparent pixel layers are covered in the red pixel layers, the green pixel layers, and the blue pixel layers by the red pixel layers, the green pixel layers, and the blue pixel layers, respectively;
the transparent pixel layers formed on the substrate and covered in each of the red pixel layers, the green pixel layers, and the blue pixel layers are disconnected, and a distance between the transparent pixel layers disconnected from each other is above 5 µm;

the columnar layers comprise sub columnar layers and main columnar layers, and a difference in film thickness between the main columnar layers is controlled within the range of ±0.1 µm; and a photoresist material used in the respective structures forming the color filter is a negative photoresist material.

2. The color filter of claim 1, wherein the height of the transparent pixel layer formed on the substrate (W height)≤the height of the black matrices formed on the substrate (BM height)+0.2 µm, that is, the A value=W height−BM height≤0.2 µm.

3. The color filter of claim 1, wherein the substrate is a glass substrate, and the color filter further comprises a conductive layer formed on the back of the substrate.

4. A display panel, comprising the color filter as claimed in claim 1.

5. A display apparatus, comprising the display panel as claimed in claim 4.

6. A method for preparing a color filter, comprising the following steps:

performing ITO film plating on the rear surface of a substrate of the color filter, forming black matrices on the front surface of the substrate, forming transparent pixel layers in the gaps between the respective black matrices formed on the front surface of the substrate, forming red pixel layers, green pixel layers and blue pixel layers on the substrate by covering the transparent pixel layers, optionally forming a planarization layer above the red pixel layers, the green pixel layers, the blue pixel layers and the black matrices, and forming the columnar layers on the planarization layer and above the corresponding black matrices, or forming the columnar layers on the corresponding black matrices without the planarization layer, wherein the transparent pixel layers formed on the substrate and covered in each of the red pixel layers, the green pixel layers, and the blue pixel layers are disconnected, and a distance between the transparent pixel layers disconnected from each other is above 5 µm;

the columnar layers comprises sub columnar layers and main columnar layers, and a difference in film thickness between the main columnar layers is controlled within the range of ±0.1 µm; and a photoresist material used in the respective structures forming the color filter is a negative photoresist material.

7. The method of claim 6, wherein the color filter prepared thereby comprises:

the substrate, the black matrices formed on the substrate, the color layers formed on the substrate, wherein the color layer comprises the red pixel layers, the green pixel layers, the blue pixel layers, and the transparent pixel layers, the planarization layer formed above the color layers and the black matrices, and the columnar layers formed on the planarization layer and located above the black matrices, wherein the transparent pixel layers are covered in the red pixel layers, the green pixel layers, and the blue pixel layers by the red pixel layers, the green pixel layers, and the blue pixel layers, respectively;

the transparent pixel layers formed on the substrate and covered in each of the red pixel layers, the green pixel layers, and the blue pixel layers are disconnected, and the distance between the transparent pixel layers disconnected from each other is above 5 µm;

the columnar layers comprise sub columnar layers and main columnar layers, and the difference in film thickness between the main columnar layers is controlled within the range of ±0.1 µm;

the photoresist material used in the respective structures forming the color filter is a negative photoresist material; and the height of the transparent pixel layer formed on the substrate (W height)≤the height of the black matrices formed on the substrate (BM height)+0.2 µm, that is, the A value=W height−BM height≤0.2 µm.

8. The method of claim 6, wherein, the substrate is a glass substrate, and the substrate further comprising a conductive layer formed on the back of the substrate.

* * * * *